(12) United States Patent
Treichler et al.

(10) Patent No.: US 7,240,179 B1
(45) Date of Patent: Jul. 3, 2007

(54) SYSTEM, APPARATUS AND METHOD FOR RECLAIMING MEMORY HOLES IN MEMORY COMPOSED OF ARBITRARILY-SIZED MEMORY DEVICES

(75) Inventors: Sean Jeffrey Treichler, Mountain View, CA (US); Brad W. Simeral, San Franciso, CA (US); David G. Reed, Saratoga, CA (US); Roman Surgutchik, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 346 days.

(21) Appl. No.: 11/012,025

(22) Filed: Dec. 13, 2004

(51) Int. Cl.
*G06F 9/26* (2006.01)
*G06F 9/34* (2006.01)
*G06F 12/00* (2006.01)

(52) U.S. Cl. .................. 711/203; 711/202; 711/220; 711/165

(58) Field of Classification Search ........... 711/202, 711/203, 220
See application file for complete search history.

(56) References Cited

U.S. PATENT DOCUMENTS

| | | | | |
|---|---|---|---|---|
| 4,511,964 A | * | 4/1985 | Georg et al. | 711/202 |
| 5,263,139 A | * | 11/1993 | Testa et al. | 710/307 |
| 5,481,689 A | * | 1/1996 | Stamm et al. | 711/202 |
| 5,721,858 A | * | 2/1998 | White et al. | 711/203 |
| 5,940,873 A | * | 8/1999 | Mou | 711/208 |
| 6,061,774 A | * | 5/2000 | Witek | 711/210 |
| 6,349,380 B1 | * | 2/2002 | Shahidzadeh et al. | 712/211 |

OTHER PUBLICATIONS

Intel(r). Intel(r) E7500 Chipset Datasheet: Intel(r) E7500 Memory Controller Hub (MCH) [online], [retrieved on Dec. 20, 2006]. Retrieved from the Internet <ftp://download.intel.com/design/chipsets/e7500/datashts/29073001.pdf>.*
Intel, "Intel® 820 Chipset: 82820 Memory Controller Hub (MCH)," Datasheet, *Copyright © Intel Corporation*, Nov. 1999, Document No. 290630-001, pp. 1-157.
Intel, "Intel® 850 Chipset: 82850 Memory Controller Hub (MCH)," Datasheet, *Copyright © Intel Corporation*, Nov. 2000, Document No. 290691-001, pp. 1-144.

* cited by examiner

*Primary Examiner*—Reginald Bragdon
*Assistant Examiner*—Larry T Mackall
(74) *Attorney, Agent, or Firm*—Cooley Godward Kronish LLP (57) ABSTRACT

A system, apparatus, and method are disclosed for increasing the physical memory address space accessible to a processor, at least in part, by translating linear addresses associated with a memory hole into a subset of physical memory addresses that otherwise is inaccessible as system memory by a processor. In one embodiment, a memory controller reclaims memory holes in a system memory divided into ranges of linear addresses, where the system memory includes a number of arbitrarily-sized memory devices. The memory controller includes a memory configuration evaluator configured to determine a translated memory hole size for a memory hole, the memory hole including restricted linear addresses that translate into a subset of physical addresses. Also, memory configuration evaluator can be configured to form adjusted ranges to translate at least one linear address into a subset of physical addresses. As such, the system memory increases by at least the subset of physical addresses.

6 Claims, 10 Drawing Sheets

SYSTEM, APPARATUS AND METHOD FOR RECLAIMING MEMORY HOLES IN MEMORY COMPOSED OF ARBITRARILY-SIZED MEMORY DEVICES

BRIEF DESCRIPTION OF THE INVENTION

This invention relates generally to computing systems and their memory, and more particularly, to increasing system memory available in physical memory address space by adjusting ranges of linear addresses to reclaim memory holes and associated physical addresses that are generally unusable by the processor as system memory (e.g., in dynamic random access memory, or DRAM).

BACKGROUND OF THE INVENTION

Many modern processors control various input/output ("I/O") devices using a memory-mapped I/O scheme, which enables a processor to communicate to an I/O device by reading and writing to one or more memory addresses reserved for that particular I/O device. A drawback of this approach, however, is that the memory addresses reserved for each I/O device reduces system memory available to the processor, such as when the reserved addresses coincide with physical addresses. Collectively, those reserved addresses constitute a "memory hole," which is a term commonly used to describe the linear address space of the memory that is unusable (or inaccessible) to a processor as system memory. As the number of I/O devices increases, the range of linear addresses reserved to service those I/O devices increases correspondingly. Consequently, the amount of memory useable as system memory decreases. To illustrate the effects of memory holes on system memory, consider a 36-bit processor having access greater than 4 GB of memory (i.e., an amount of memory including $2^{36}$ addresses) and being a part of a computing system having two graphics processing units ("GPUs") as I/O devices. Usually, each of these GPUs can require 1024 megabytes (MB) of address space (i.e., an amount of memory including $2^{30}$ addresses) in system memory to maintain frame buffers, which would then require reserving a total amount of 2 gigabytes ("GB") of address space to cover the two GPUs. Moreover, additional system memory must be dedicated for boot code and for other I/O devices, such as audio and visual devices. Consequently, the processor of this example would have less than one-half of its system memory available to perform its computational tasks. So if reserved memory were to expand without bound, processors would be left without much system memory with which to operate.

There are several memory addressing techniques known for redirecting accesses from one range of addresses of memory to another range of addresses. Some of these techniques are used for reducing the effects of memory holes, while others are directed toward other memory management functions.

Figure 1A:
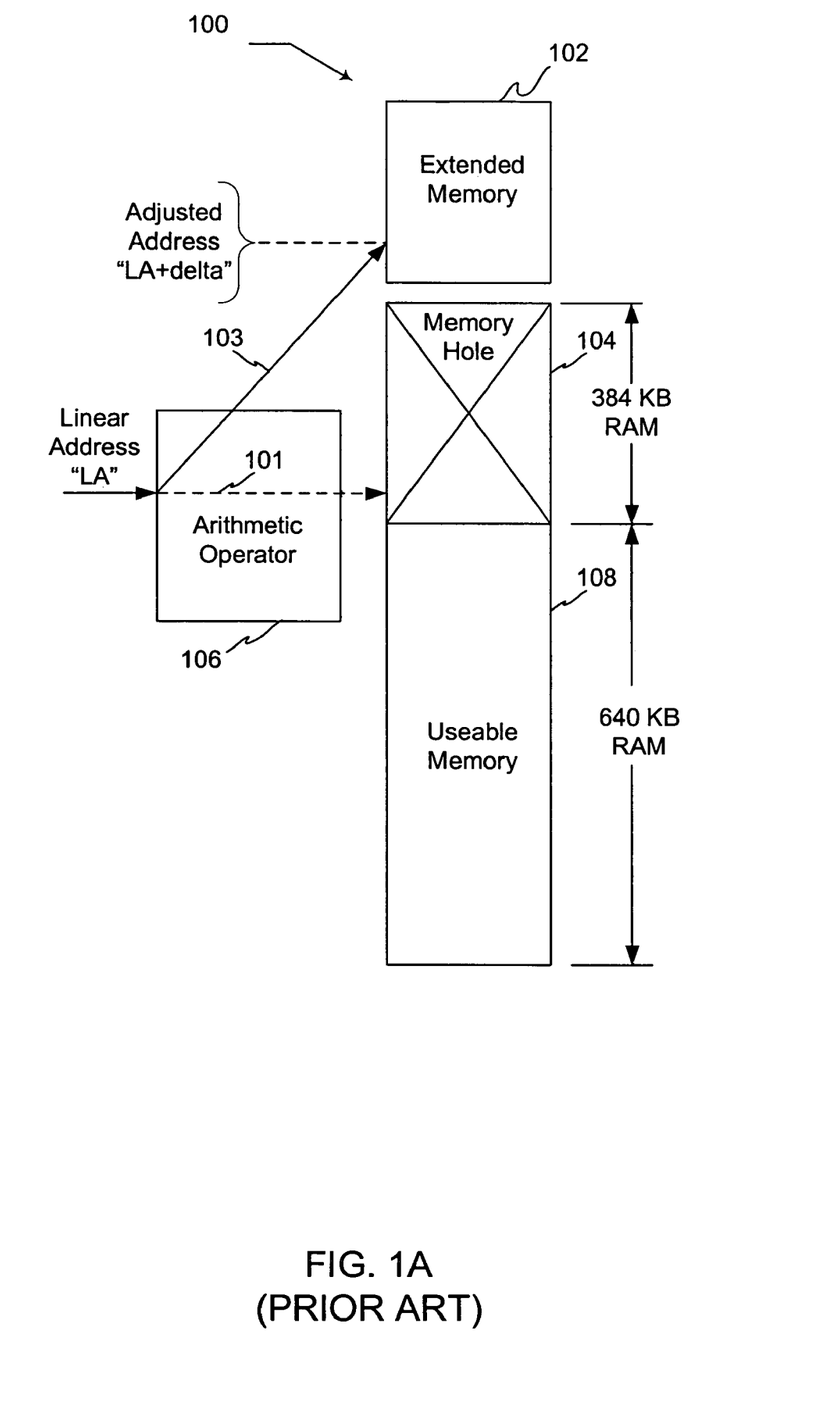
FIGS. 1A and 1B show conventional memory addressing techniques for managing memory.

FIG. 1A illustrates one memory addressing technique used for ameliorating the effects of memory holes. In this approach, system memory 100 is increased by adding extended memory 102 to the normal amount of memory available ("useable memory") 108 that is useable by a processor (not shown), which typically is about 680 kilobytes ("KB"). By adding extended memory 102, system memory 100 recovers the 340 KB of system memory usually lost to memory hole 104. In this memory addressing technique, an arithmetic operator 106 adds an amount, "delta," to a linear address ("LA") 101 to form adjusted address 103 (i.e., LA+delta), but only if address 101 is above 640 KB. The amount delta is a single quantity of addresses representing a displacement in linear address space. Arithmetic operator 106 therefore uses addition to redirect address 101 from a reserved address space in memory hole 104 to the supplemental address space in extended memory 102, thereby recovering memory that otherwise would not be available to the processor. While functional, adding an amount "delta" to an address is relatively cumbersome in execution and requires more hardware to implement adders than otherwise is necessary to reduce the effects of memory holes.

Figure 1B:
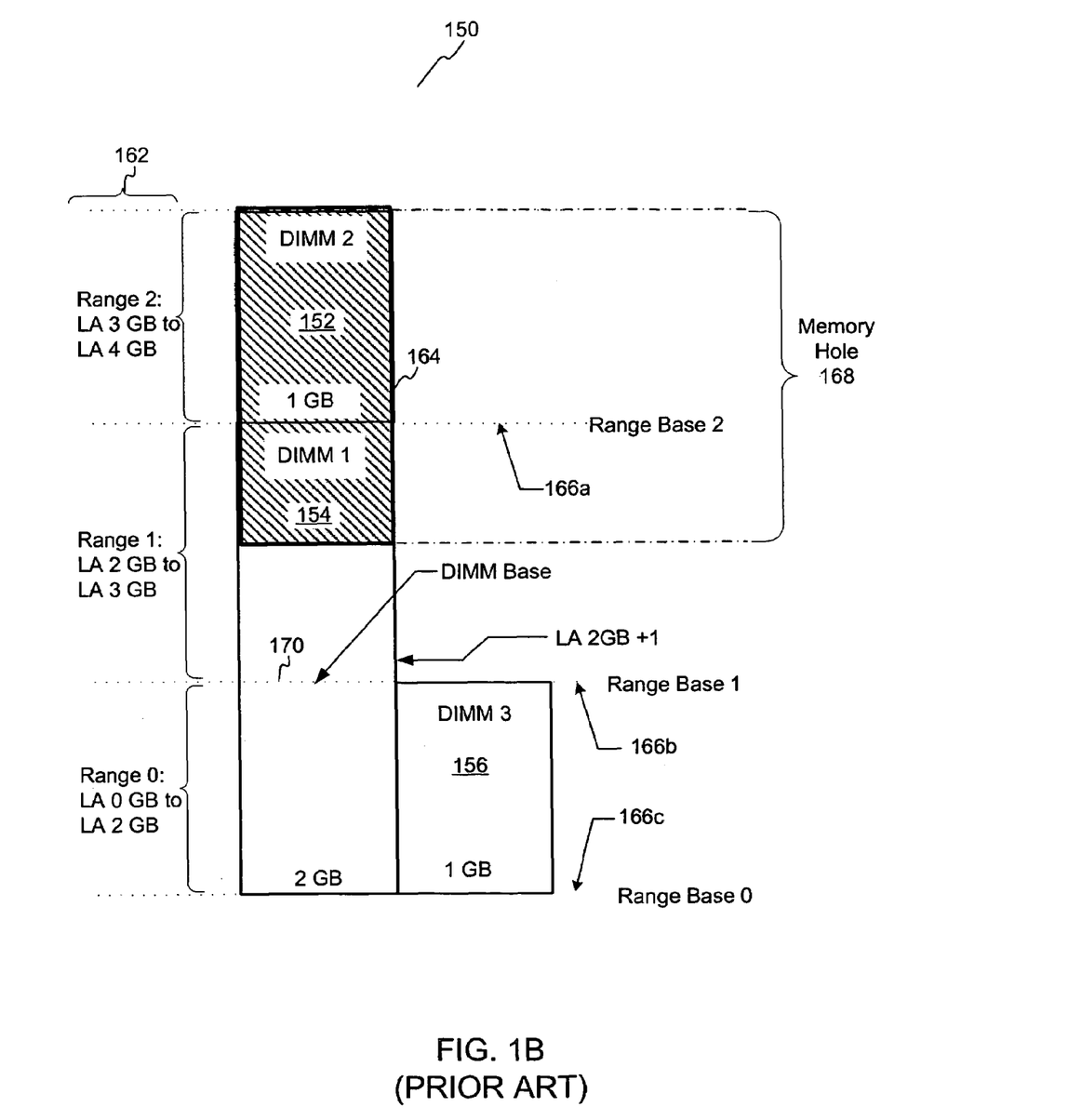

FIG. 1B shows another conventional memory addressing technique for managing memory. In this technique, system memory 150 contains three disparately sized dual in-line memory modules ("DIMMs"), such as DIMM ("1") 154, DIMM ("2") 152 and DIMM ("3") 156, that are collectively divided into ranges of linear addresses 162. Each range 162 corresponds to a range of physical addresses and has a range base 166 describing a base address for that range. For example, Range 1, which extends from linear address ("LA") 2 GB to LA 3 GB, has a range base ("1") 166b of 2 GB. As such, linear addresses from 0 GB to 2 GB map into physical addresses 0 GB to 1 GB-1 of DIMM ("1") 154, as translated from range base ("0") 166c, and linear addresses 2 GB to 3 GB map into physical addresses 1 GB to 2 GB-1 of DIMM ("1") 154, as translated from range base ("1") 166b. A DIMM base address ("DIMM Base") 170 is selected to relate a linear address, such as "LA 2 GB+1," to the physical addresses of system memory 150. Notably, linear addresses of a memory hole 168 also correspond to physical addresses in system memory, and specifically, to a group 164 of physical addresses that includes data for memory-mapped I/O devices. As such, a processor cannot use group 164 of physical addresses to process computations. While functional in addressing some system memories, this conventional memory technique does not ameliorate the effects of memory holes and is not readily adaptable to do so.

In view of the foregoing, it would be desirable to provide a system, an apparatus and a method for minimizing the drawbacks of the above-mentioned memory addressing techniques in the reclamation of memory in any number of arbitrarily-sized memory devices that otherwise would be lost to a memory hole.

SUMMARY OF THE INVENTION

A system, apparatus, and method are disclosed for increasing the physical memory address space accessible to a processor, at least in part, by translating linear addresses associated with a memory hole into a subset of physical memory addresses that otherwise is inaccessible as system memory by a processor. In one embodiment, a memory controller reclaims memory holes in a system memory divided into ranges of linear addresses, where the system memory includes a number of arbitrarily-sized memory devices. The memory controller includes a memory configuration evaluator configured to determine a translated memory hole size for a memory hole, the memory hole including restricted linear addresses that translate into a subset of physical addresses. Also, memory configuration evaluator can be configured to form adjusted ranges for translating at least one linear address into a subset of physical addresses. As such, the system memory can be increased by at least the subset of physical addresses. In another embodiment, the memory controller further comprises an address translator configured to generate at least a portion of a translated address, which can be one of the subset of physical addresses. The adjusted ranges enable formation of translated addresses, one of which is the translated address, prior to translating the linear address. This minimizes time delays associated with determining the adjusted ranges in series with forming of each of the plurality of translated addresses. In some embodiments, address translator is configured to translate the linear address in parallel with detecting an adjusted range to which that linear address relates, thereby minimizing time delays in reclaiming said memory hole by performing address translation and adjusted range detection in parallel.

In another embodiment, an exemplary system translates a linear address related to a reclaimed memory hole during conversion to a row-column-bank ("RCB") address. The system comprises a processor configured to execute program instructions and to fetch program data specified by a linear address. The system also comprises a memory to store the program instructions and the program data. The memory has a physical address space composed of a number of dual in-line memory modules ("DIMMs") arbitrarily arranged over one or more partitions. The term partition generally refers to a grouping of memory devices that form a separate memory from other partitions, where each partition can be controlled by separate memory controller. Each DIMM can have any arbitrary size. The physical address space is divided into ranges of physical addresses associated with ranges of linear addresses. The memory also includes a subset of physical addresses of the physical address space that correspond to a memory hole composed of restricted linear addresses dedicated for servicing memory-mapped devices. The memory hole extends from a top of physical memory ("TOPM") address to a top of useable memory ("TOUM") address. The system also includes a memory controller comprising a memory configuration evaluator configured to form adjusted ranges of linear addresses whereby at least one adjusted range includes the linear address for translation into the subset of physical addresses. The memory controller can also include an address translator to translate at least a portion of the linear address to form a portion of a translated address based on an adjusted range base associated with the linear address.

In yet another embodiment of the present invention, an exemplary method for reclaiming a memory hole to increase memory available to a processor is disclosed. The method comprises dividing into ranges of linear addresses a system memory including a number of arbitrarily-sized memory devices. Further, the method includes identifying a memory hole that includes restricted addresses associated with a subset of physical addresses, and adjusting a base of at least one of the ranges of linear addresses to form an adjusted range base corresponding to a base linear address defining the memory hole, wherein the adjusted range base is used to translate linear addresses into the subset of physical addresses. In a specific embodiment, the method further comprises establishing a memory device base corresponding to the base linear address for specifying a physical address of the subset of physical addresses translated from a linear address of the linear addresses. Further, the method can also include translating the linear address into the physical address, which otherwise is restricted from access by a processor.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF EXEMPLARY EMBODIMENTS

Figure 2:
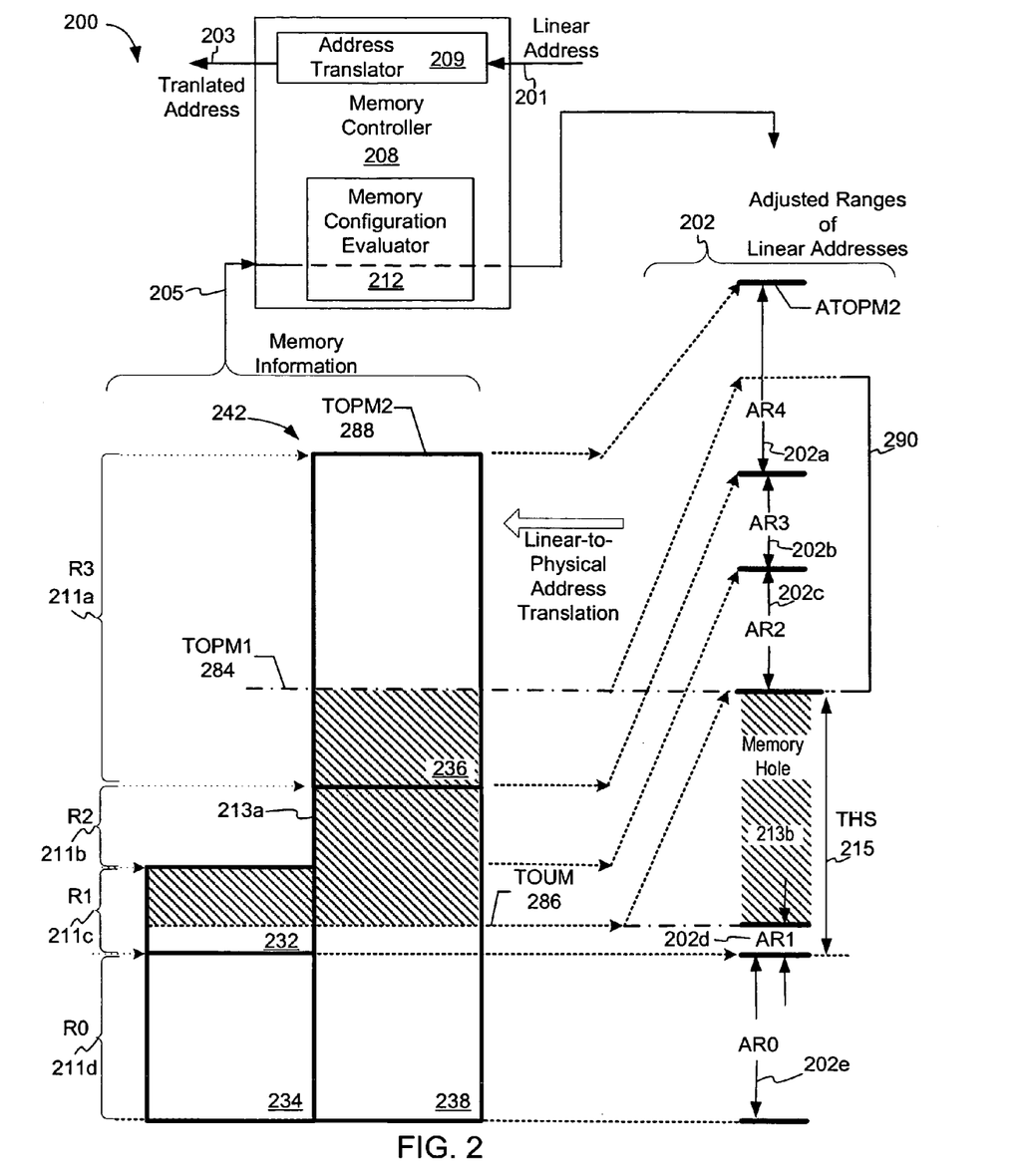
FIG. 2 is a diagram illustrating a memory controller for reclaiming memory holes to increase available system memory in accordance with a specific embodiment of the present invention.

FIG. 2 is a diagram 200 illustrating a memory controller 208 for reclaiming memory holes to increase available system memory in accordance with a specific embodiment of the present invention. As shown, a physical address space 242 can be divided into ranges 211a to 211d of linear addresses (i.e., ranges R0, R1, R2 and R3), which are associated with ranges of physical addresses in physical address space 242. Physical address space 242, in at least this example, is composed of four memory devices 232, 234, 236 and 238, all of which can be of arbitrary size (i.e., there is no requirement that they all be the same size.). Ranges 211a to 211d include linear addresses associated with at least one memory hole 213b that, for example, are reserved for accessing memory-mapped input/output ("I/O") devices. Consequently, linear addresses of memory hole 213b are unavailable to translate into address space 213a, thereby rendering address space 213a unusable (or inaccessible) as system memory for a processor (not shown).

Memory controller 208 is configured to access physical addresses constituting address space 213a by redirecting accesses to specific linear addresses into address space 213a, thereby "reclaiming" those physical addresses for use as system memory. As such, address space 213a can be referred to as a "reclaimed memory hole" and the group of specific linear addresses that translate into the reclaimed memory hole can be referred to as a "reclaimed memory hole window" 290. The linear addresses of reclaimed memory hole window 290 can be referred to as restricted addresses since they are restricted from use as system memory; rather these addresses are typically used for other purposes, such as accessing memory-mapped devices. In one embodiment, memory controller 208 is configured to adjust one or more ranges 211a to 211d to form adjusted ranges 202 of linear addresses. Adjusted ranges 202 provide additional linear addresses (e.g., an amount equivalent to those constituting memory hole 213b), some of which map or translate into address space 213a. These adjusted ranges are used to reclaim a group of physical addresses for use as system memory by a processor (not shown) rather than being excluded from use as accessible physical address space. Linear addresses are those addresses used by a processor, each of which can require translation (e.g., by a row-column-bank decoder or the like, within or without memory controller 208) into a physical address. A physical address is a hardware memory location, for example, in a DRAM memory device.

In a specific embodiment of the present invention, memory controller 208 includes at least a memory configuration evaluator 212 and an address translator 209. Memory configuration evaluator 212 is configured to determine a translated hole size ("THS") 215 for memory hole 213b, in whole or in part, and is further configured to adjust one or more of ranges 211a to 211d to form adjusted ranges 202 of linear addresses, such as ranges 202a to 202e. Address translator 209 is configured to receive linear addresses and to generate a translated address 203 that is (or can be) associated with an accessible physical address so that additional physical address space can be accessed, thereby increasing available system memory. According to one embodiment, address translator 209 is configured to translate at least one linear address 201 of one of adjusted ranges 202 (e.g., adjusted ranges 202a, 202b, or 202c) into physical addresses of address space 213a. Note that adjusted ranges 202a (portion of), 202b, and 202c form reclaimed memory hole window 290.

Memory controller 208 operates to adjust ranges 211a to 211d based on, at least in part, memory information 205 characterizing physical address space 242. Examples of such memory information 205 include the number of memory devices constituting physical address space 242, the size or capacity of each memory device, memory device identifiers for the memory devices, the partition (if more than one) of each memory device belongs, and/or any other characteristic suitable for use by memory configuration evaluator 212 to adjust ranges 211a to 211d, such as a second top of physical memory ("TOPM2") 288 to define the maximum physical memory address (or capacity) of physical address space 242. Most of these characteristics of memory information 205 are discussed below. An exemplary system and its component modules for implementing memory controller 308 are discussed next with respect to FIG. 3A, followed by additional description of FIG. 3B to illustrate adjusting ranges in accordance with a specific embodiment of the present invention.

Figure 3A:
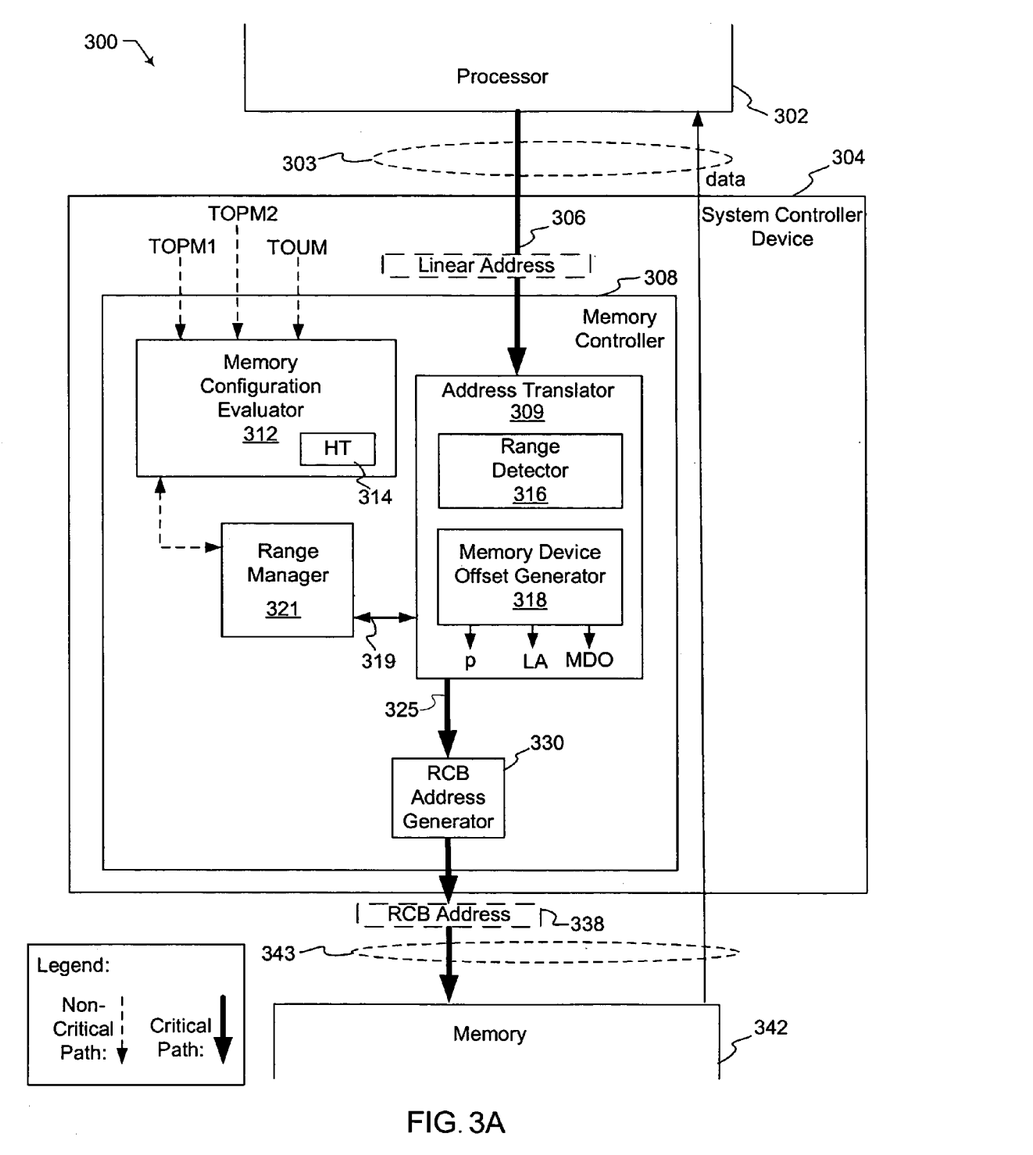
FIG. 3A is a block diagram illustrating a system that includes a memory controller for at least translating a linear address into a translated address, which corresponds to an accessible physical address rather than being reserved for uses other than as system memory, according to a specific embodiment of the present invention.

FIG. 3A is a block diagram illustrating a system 300 that includes a memory controller 308 for at least translating a linear address ("LA") 306 into a translated address 325 that corresponds to an accessible physical address rather than a reserved physical address, according to a specific embodiment of the present invention. Translated address 325 enables a processor to access a physical address space that otherwise would be associated with linear addresses of memory hole 213b. In this example, memory controller 308 is disposed within a system controller device 304 that, in whole or in part, either constitutes a Northbridge "chip" or "chip set," or has an equivalent functionality as a Northbridge device. In particular, device 304 at least controls interactions among processor 302, memory 342, and I/O devices (not shown), such as those devices associated with an Accelerated Graphics Port ("AGP") or a local Peripheral Component Interconnect ("PCI") bus. As such, device 304 is communicatively coupled over at least one bus, such as front side bus 303, to at least one processor 302 and to any number of I/O devices, which can include one or more graphics processing units ("GPUs") (not shown). In some instances, device 304 is communicatively coupled via memory bus 343 to memory 342. During execution of its program instructions, processor 302 provides a linear address 306 to memory controller 308 as part of a processor request requiring access to data in memory 342. In some cases, memory 342 provides physical address space 242 (FIG. 2) with a group of physical addresses 213b constituting a reclaimed memory hole. As some I/O devices are associated with PCI buses, memory hole 213b can be referred to as a "PCI memory hole" in such instances. In some cases, Scalable Link Interface ("SLI")™ Technology can be implemented to maintain one or more frame buffers for one or more GPUs. SLI™ is proprietary technology developed by NVIDIA® of Santa Clara, Calif.

Memory controller 308 includes a memory configuration evaluator 312, a range manager 321, and an address translator 309, any of which can be implemented in either hardware or software, or both. Memory configuration evaluator 312 is configured to receive memory information 205 to adjust ranges 211a to 211d to form adjusted ranges 202a to 202e. In some embodiments, memory configuration evaluator 312 is also configured to adjust other range-related parameters, such as memory device identifiers for one or more ranges, one or more memory device bases, and other like parameters useful to translate linear address 306 based on adjusted ranges. Further, memory configuration evaluator 312 is configured to at least receive addresses TOPM1, TOPM2 and TOUM and to generate a translated hole size ("THS") 315. In various embodiments, processor 302, system controller device 304, and/or memory controller 308 can provide addresses TOUM, TOPM1 and TOPM2. As values for these addresses need not be computed by memory controller 308 or its components, less computational overhead is necessary to reclaim memory holes based on adjusted ranges. So, for example, if values for addresses TOUM and TOPM1 were provided by a central processing unit, such as from its registers (e.g., such as a TOM or TOM1 register), then reclamation of memory hole 213b using addresses TOUM, TOPM1 and TOPM2 decreases the amount of computational resources and time necessary to reclaim memory holes. In at least one specific embodiment, memory configuration evaluator 312 can be configured to recalculate TOM1 and TOM2 (i.e., TOPM1 and TOPM2) from an initial state as determined by a basic input/output system ("BIOS") program upon initialization. Generally, the BIOS stores values for TOPM1 and TOPM2 into registers for use by the memory configuration evaluator. The following discusses operation of memory configuration evaluator 312 in view of the examples set forth in FIGS. 2 and 3B, according to at least one specific embodiment of the present invention.

First, memory configuration evaluator 312 determines a memory hole size ("MHS") for a memory hole, such as memory hole 213b. Memory configuration evaluator 312 can establish the memory hole size, for example, by determining the difference (in terms of addresses) between addresses TOPM1 and TOUM. In particular, TOPM1−TOUM=MHS. As an example, consider that address TOPM1 has a value of 4 GB and address TOUM has an approximate value of 2.3 GB, with MHS being determined to be a number corresponding to 1.70 GB addresses. But the memory hole size of 1.70 GB, as is most memory hole sizes, is not of a granularity that is suitable for adjusting ranges of memory devices that are multiples of, for example, 64 MB, 128 MB, 256 MB, 512 MB, 1 GB, 4 GB, or most any other size for implementing system memory 342.

Figure 3B:
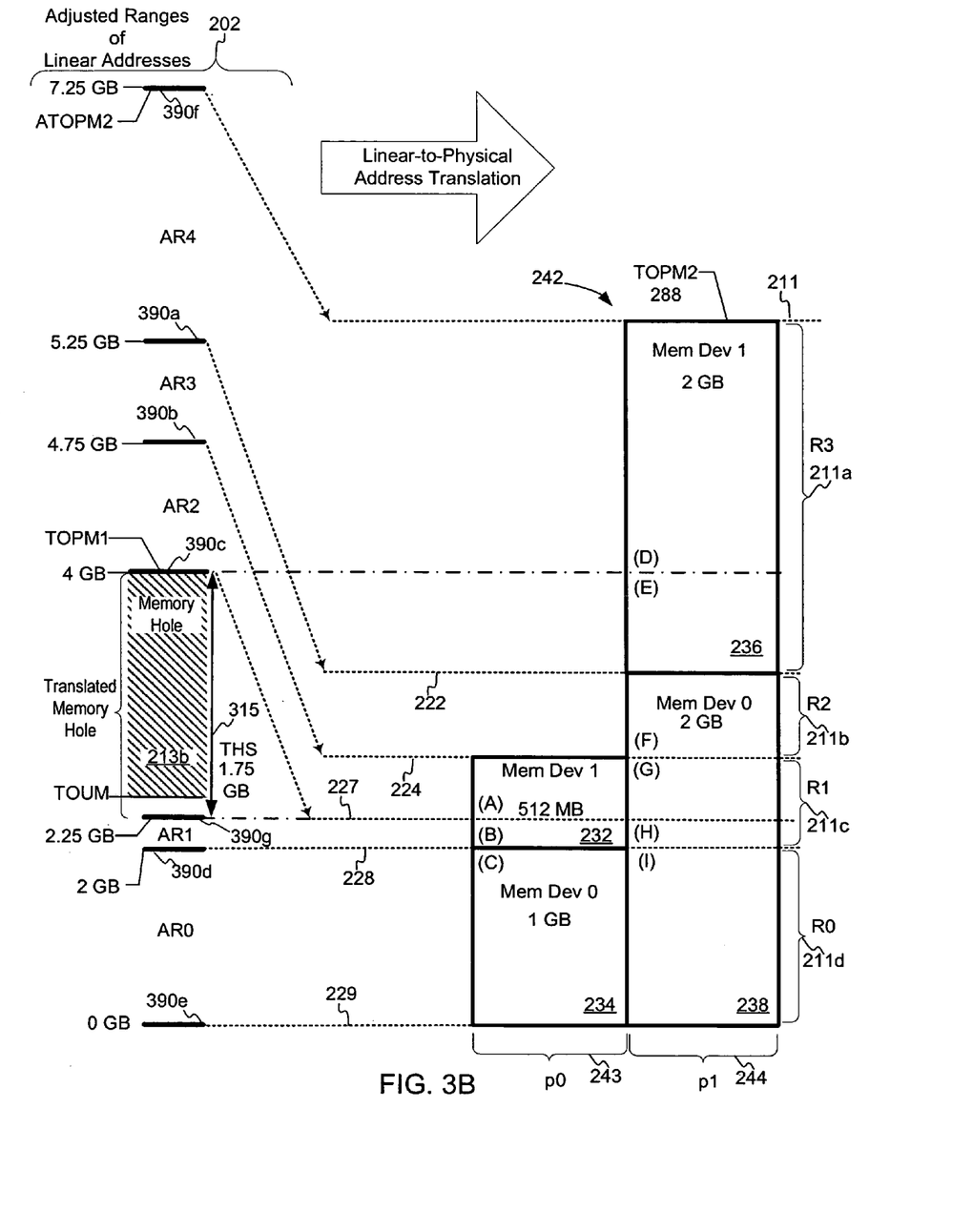
FIG. 3B illustrates a diagram depicting the adjusting of ranges in one exemplary configuration of memory devices in accordance with a specific embodiment of the present invention.

Next, a hole translator ("HT") 314 translates the MHS of memory hole 213b into THS 315 to adjust ranges 211a to 211d to conform to specific sizes of the memory devices of system memory 342. Generally, HT 314 translates MHS into a multiple of the capacity for the smallest memory device constituting system memory 342. For example, if address TOUM is within a range associated with two or more memory devices (e.g., is in an interleaved memory space), and if the smallest memory device is 128 MB, then HT 314 will translate 1.70 GB into 1.75 GB, which is multiple of 128 MB (i.e., N*128 MB, where N is 14 such that 14*128 MB=1.75 GB). FIG. 3B depicts a translated hole size being 1.75 GB. HT 314 is also configured to set THS 315 (e.g., 1.75 GB). Note that if HT 314 determines a THS 315 that causes the base of a translated memory hole to coincide with an existing range base, then an additional adjusted range (e.g., AR2) may not be required. Note that in some embodiments, HT 314 can be omitted if, for example, a BIOS (not shown) operates to automatically align (e.g., round-up) or size the hole size to a next multiple.

Figure 4:
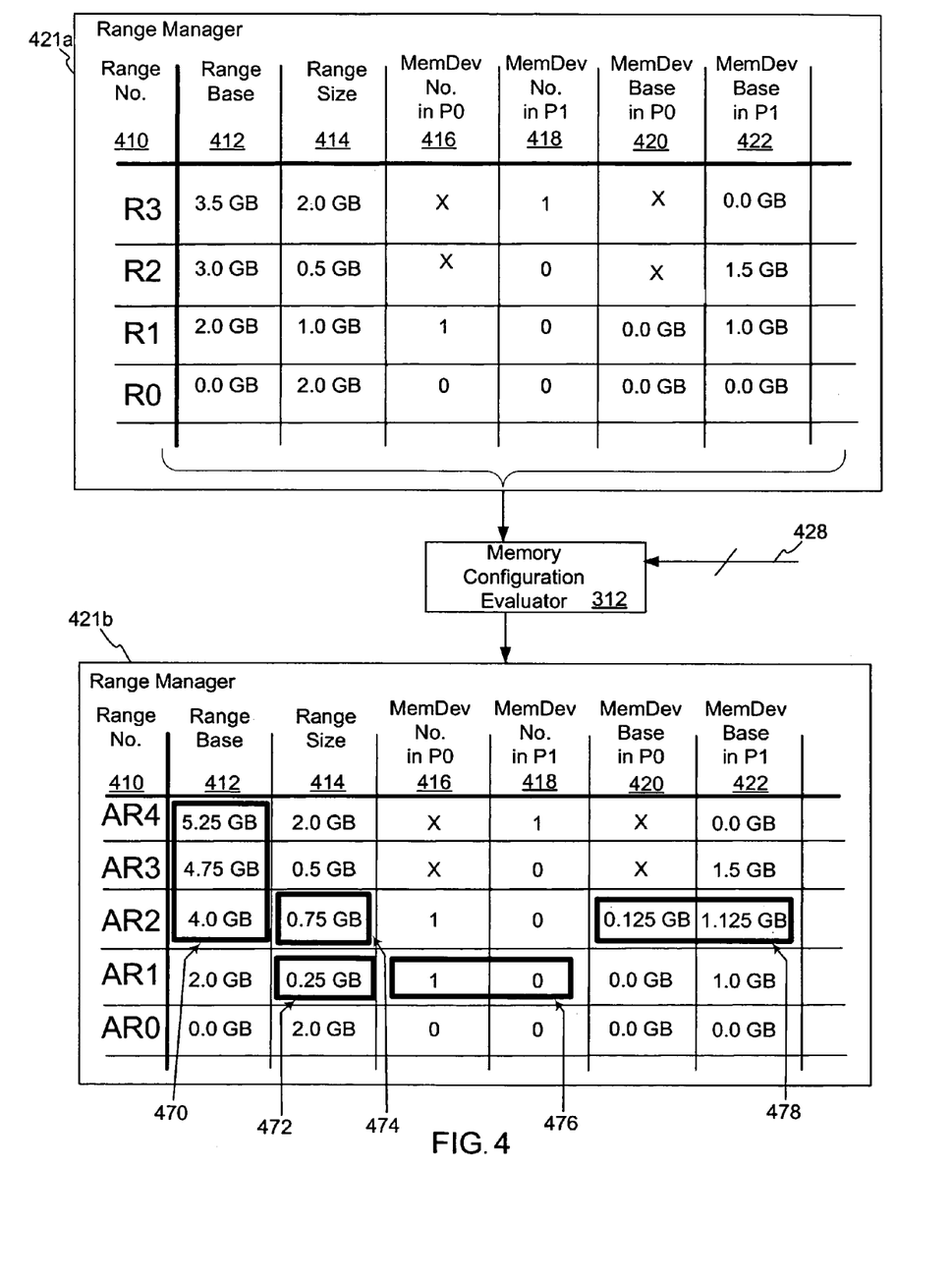
FIG. 4 illustrates a specific configuration of a range manager, according to one embodiment of the present invention.

Memory configuration evaluator 312 is configured to at least modify memory information 205 maintained in range manager 321. In one embodiment, range manager 321 includes a repository to store memory information 205, and memory configuration evaluator 312 includes logic to modify data stored within range manager 321 to form adjusted ranges and to update other range parameters specific to each adjusted range. In a specific embodiment, range manager 321 can include logic to provide some or all specific range parameters 319, some of which are exemplified in FIG. 4 for one or more adjusted ranges. Also note that FIG. 4 depicts the exemplary functionalities of memory configuration evaluator 312 and range manager 321.

Figure 7:
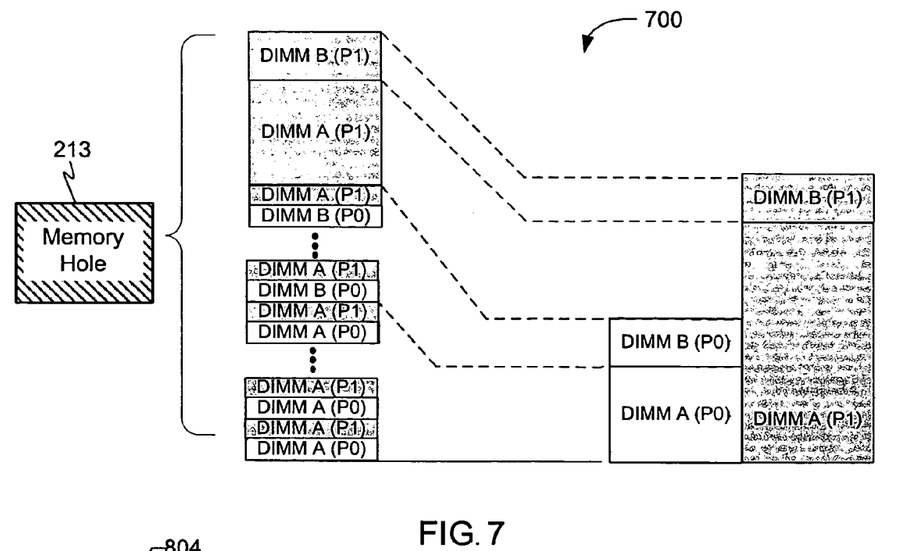
FIGS. 7 to 9 illustrate techniques for dividing system memory in manners suitable for reclaiming memory holes in accordance with various embodiments of the present invention.
Figure 8:
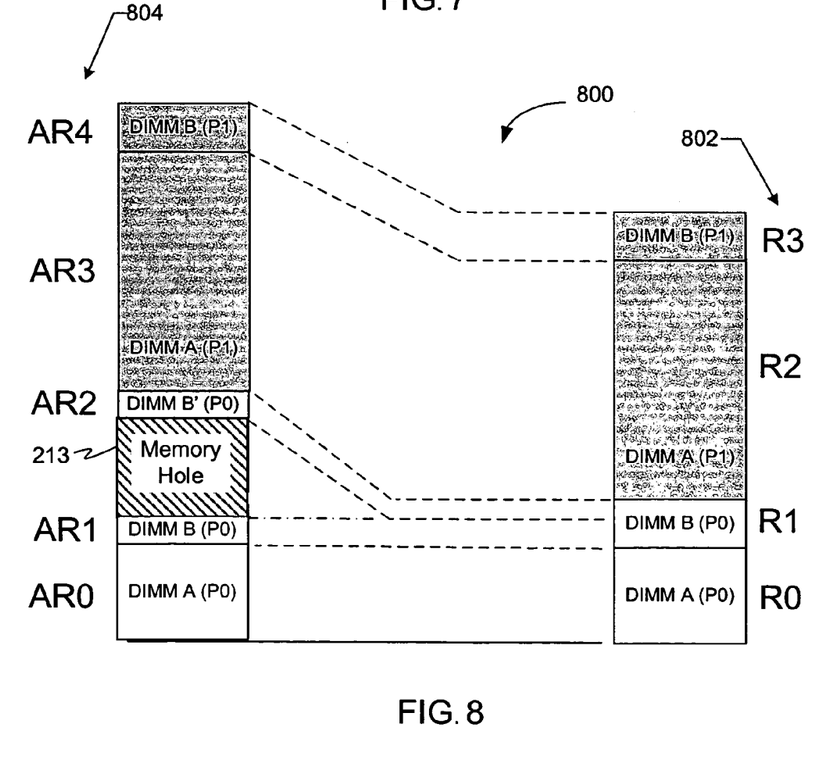
Figure 9:
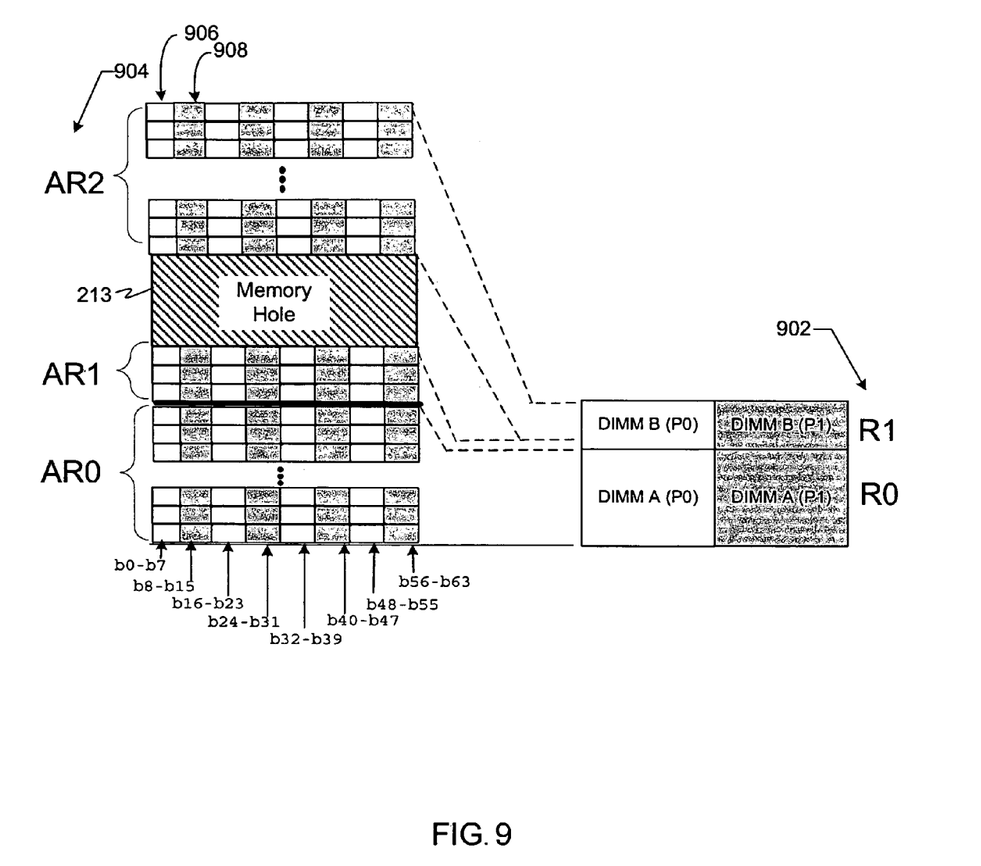

In a specific embodiment, two or more memory controllers 208 are each configured to control memory accesses to separate groupings of memory devices that form different memory spaces. Those groupings are each referred to as a "partition" and are discussed further below. In some embodiments, adjusted ranges 202 of linear addresses are "non-interleaved," which means that consecutive linear addresses generally relate to the same partition of physical addresses. FIG. 8 shows an example of non-interleaved linear addresses. In some embodiments, adjusted ranges 202 of linear addresses are "interleaved" (i.e., linear addresses from different partitions are interspersed (e.g., non-consecutively) throughout the linear address space). FIG. 7 illustrates an example of interleaved linear addresses. Note further that adjusted ranges 202 of linear addresses can be arranged by using a "gang" mode of interleaving linear address spaces, such as shown in FIG. 9.

Referring back to FIG. 3A, address translator 309 is configured to receive one or more linear addresses, such as linear address 306, and is configured to receive range parameters 319. Address translator 309 generally operates to determine which of the adjusted ranges that linear address 306 relates and uses range parameters 319 for the related adjusted range to generate at least a memory device offset as a portion of translated address 325. In a specific embodiment, address translator 309 includes a range detector 316 and a memory device offset generator ("MDOG") 318. Range detector 316 is configured to compare linear address 306 against at least the adjusted range bases to determine the specific adjusted range, "AR(N)," to which linear address 306 belongs, where N represents a number identifying the specific adjusted range.

MDOG 318 uses at least an adjusted range base, or "ARB(N)," and at least one memory device base, or "MB (N)," for the translation of linear address 306 in the specific adjusted range AR(N). MDOG 318 uses ARB(N) to determine a range offset, or "RO," which represents a value indicating the position of linear address 306 in linear address space with respect to one of the adjusted ranges. Then, MDOG 318 uses RO to form a memory device offset ("MDO") that identifies a position of a physical address (i.e., in physical address space) in a specific memory device to which linear address 306 translates. In one embodiment of the present invention, MDO forms a portion of translated address 325 (i.e., fewer bits than those bits constituting linear address 306). In another embodiment, MDOG 318 generates and/or provides a partition number, "p," and some or all of the bits of linear address ("LA") 306. In some cases, a memory device identifier, or "MDI" (not shown), is also provided by MDOG 318 to identify the specific memory device in partition p. An example of the memory device identifier MDI is a DIMM Number, such as "DIMM 1" for memory device 236. In a specific embodiment, translated address 325 includes MDO, p, MDI, and bits of LA, with MDO being equivalent to a DIMM offset.

In one embodiment, translated address 325 is communicated to optional row-column-bank ("RCB") address generator 330 for converting translated address 325 into an RCB-formatted address, such as RCB address 338, for accessing memory 342. Note that RCB address 338 can have its row, column and bank bits arranged in any order (e.g., from most to least significant bit: row bits, bank bits, column bits) and can be formed by any suitable RCB address conversion technique known in the art.

In at least one embodiment, memory configuration evaluator 312 lies off the critical path and its functionalities does not directly depend on each linear address 306 undergoing address translation. As such, the adjusted ranges of linear addresses can be determined periodically or at processor initialization irrespective of the value of a specific linear address 306 being translated by address translator 309. The "critical path," as is used herein, is a series of interdependent activities connected end-to-end in processing memory accesses, and it determines the shortest amount of time to perform such memory accesses. FIG. 3A depicts the critical path as a heavy-weighted line. Address translator 309, for example, lies on the critical path and therefore directly affects memory access performance. But by placing at least memory configuration evaluator 312 off the critical path, the memory hole reclamation translation process is also placed off the critical path and onto a non-critical path. So, address translation for supporting memory hole reclamation, according to at least one embodiment of the present invention, can be implemented without introducing delay into RCB decoding.

Memory configuration evaluator 312 also enables translation of linear addresses 306 to translated addresses 325 without requiring dedicated arithmetic resources, such as adding and subtracting circuits, to translate linear addresses into address space 213a containing the reclaimed memory hole. Further, memory configuration evaluator 312 can also determine adjusted ranges 202a to 202e for more than one linear address 306 so that the determination of adjusted ranges 202a to 202e need not be in series (i.e., can be substantially in parallel) with linear-to-physical address translation, thereby avoiding memory hole reclamation determinations that otherwise might be applied to each linear address undergoing translation. As such, the functionality of memory configuration evaluator 312 need not lie on the critical path of linear-to-physical address translation, thereby minimizing time delays associated with reclaiming memory hole 213b. As arithmetic resources for memory hole reclamation are not necessary to be in series with range detection, the time to compute translated addresses for reclaim memory holes is minimized regardless of whether the computations are performed by either hardware or software, or both.

In a specific embodiment, a memory controller for reclaiming memory holes includes a first path configured to receive memory information. For example, such information can be address information, such as the number of addresses in a memory hole. Further to the first path, a memory configuration evaluator is configured to generate a translated memory hole size for a memory hole using a portion of the memory information and to adjust a range of linear addresses. A second path is configured to receive a linear address and includes an address translator for translating the linear address into a translated address based on the adjusted range of linear addresses. In one embodiment, the first path is a non-critical path and the second path is a critical path, both of which are substantially parallel to each other.

FIG. 3B illustrates a diagram depicting the adjusting of ranges in an exemplary configuration of memory devices in accordance with a specific embodiment of the present invention. To illustrate the functionality of memory configuration evaluator 312, consider that four arbitrarily-sized memory devices constitute system memory 342. These memory devices include: a first memory device identified as memory device zero ("Mem Dev 0") 238 with a capacity of 2 GB; a second memory device identified as memory device one ("Mem Dev 1") 236 with a capacity of 2 GB; a third memory device identified as memory device zero ("Mem Dev 0") 234 with a capacity of 1 GB; and a fourth memory device identified as memory device one ("Mem Dev 1") 232 with a capacity of 512 MB. In a specific embodiment, two or more memory controllers 208 are each configured to control memory accesses to each "partition" of physical address space 242 independently, where a partition is a grouping of memory devices that form a separate memory from other partitions. Multiple memory controllers 208 tend to increase memory access performance. So in this example of FIG. 3B, a first partition ("partition 0," or "p0") 243 can be configured to include memory devices 232 and 234, and a second partition ("partition 1," or "p1") 244 can be configured to include memory devices 236 and 238. Note that as depicted in FIG. 2, memory controller 208 conceptually represents one or more memory controllers 208 for implementing any number of partitions.

Next; consider that physical address space 242 is initially divided into ranges 211a to 211d of linear addresses shown in FIG. 2. In this example, physical address space 242 has 5.5 GB memory locations that are disposed over four ranges. Range ("R0") 211d is a range of linear addresses from address 0 GB to address 2 GB (where address 1 GB is identified by an address or memory location numbered as address $2^{30}$), range ("R1") 211c is a range from address 2 GB to address 3 GB, range ("R2") 211b is a range from address 3 GB to address 3.5 GB and range ("R3") 211a is a range from address 3.5 GB to address 5.5 GB. Note that in some cases, the highest address in each range can be numbered one less than is indicted. For example, range 211d can be described as extending from 0 GB address to "2 GB−1." But for purposes of clarity, the "−1" is omitted above and throughout. One having ordinary skill in the art should readily understand which address is actually one less than as is identified.

At least initially, each transition from one memory device to another defines a portion of one of ranges 211a to 211d. Transitions from lower to higher numbered addresses define range bases for ranges 211a to 211d, each range base identifying the cumulative number of linear addresses from linear address 0 to a particular range base. Specifically, the base of range ("R0") 211d at line 229 is the base address from which other linear addresses in range ("R0") 211d are identified when those linear addresses are translated into regions "(C)" and "(I)" of physical addresses. Base of range ("R1") 211c at line 228 is the base address with which to translate linear addresses into regions "(A)," "(B)," "(G)," and "(H)" of physical addresses. Similarly, bases of ranges ("R2") and ("R3") are coextensive with lines 224 and 222, respectively, and can translate linear addresses into respective physical address regions "(F)," and "(D)" and "(E)." For example, the base address of range ("R1") 211c, which is at line 228, represents a number of 2 GB linear addresses.

Without adjusting ranges for a memory hole, linear addresses of memory hole 213b would translate into physical addresses ranging from a first address identified as "top of useable memory" ("TOUM") to a second address identified as a first "top of physical memory" ("TOPM1"). In this case, most of physical addresses in regions "(A)" and "(G)" and all of regions "(F)" and "(E)" would typically be "hidden" (i.e., unusable as system memory) by the memory hole including linear addresses reserved for memory-mapped I/O devices. To reclaim physical address regions "(A)," "(G)," "(F)" and "(E)" as accessible system memory, memory controller 308 first determines the size of memory hole 213b, which in this example, is determined to be about 1.70 GB (i.e., memory hole 213b includes a number of addresses equivalent to 1.70 GB). Then, memory controller 308 transforms (i.e., sizes) the size of memory hole 213b to a translated hole size 215, which in this example is 1.75 GB. Using translated holes size ("THS") 215 and other memory information 205, memory configuration evaluator 312 can form adjusted ranges 202 to preclude translations from memory hole 213b. Note that if the linear address space is interleaved, such as shown in FIG. 7, and if the linear addresses of a memory hole hits interleaved physical address space, then the granularity of THS 215 is typically twice the size of the smallest memory device (or DIMM). The formation of adjusted ranges 202 is discussed next.

Further to the previous example of FIG. 3B, memory configuration evaluator 312 employs range ("R0") 211d and its range base at line 229 as adjusted range 0 ("AR0") and adjusted range base 390e, respectively. In this instance, memory configuration evaluator 312 forms adjusted range 1 ("AR1") as a modified range to include linear addresses from an address defining a lower address of THS 215, such as an address numbered as 2.25 GB, down to a next lower adjusted range base 390d, such as an address numbered as 2 GB. Incidentally, linear addresses in AR1 are translated into physical addresses in regions "(B)" and "(H)." Also, memory configuration evaluator 312 adjusts range 211c in linear address space and size to form an additional adjusted range as adjusted range two ("AR2"), which has an adjusted range base 390c at TOPM1, or 4 GB in this case, that maps to a physical address depicted by line 227. This line is the adjusted range base for AR2, which translates linear addresses, such as addresses numbered 4 GB to 4.75 GB, into physical address regions "(A)" and "(G)." Further, memory configuration evaluator 312 adjusts ranges 211b and 211a in linear address space to form adjusted ranges three ("AR3") and four ("AR4"), respectively. Adjusted range three ("AR3") has adjusted range base 390b mapping via line 224 to a physical address in physical address space 242, whereby linear addresses numbered 4.75 GB to 5.25 GB translate into region "(F)." Also, adjusted range four ("AR4") has adjusted range base 390a mapping via line 222 into physical address space 242, whereby linear addresses numbered 5.25 GB to 7.25 GB translate into physical address regions "(E) and "(D)." The address identified as TOPM2 288 is adjusted to a number representing an adjusted TOPM2 ("ATOPM2") address 390f. In view of the foregoing, adjusted ranges two, ("AR2"), three ("AR3") and four ("AR4") provide for memory hole reclamation by translating linear addresses into regions that normally would be reserved for memory hole 213b.

In a specific embodiment of the present invention, physical address space 242 can be embodied in dynamic random access memory, or DRAM, and address TOPM2 can be a 36-bit address representing 16 GB of memory. In addition, the memory devices of FIG. 3B can be dual in-line memory modules ("DIMMs"), each being of arbitrary size. In another specific embodiment, physical address space 242 is "interleaved," an example of which is discussed with respect to FIG. 7. Interleaved memory alternates, or intersperses, linear addresses from partitions ("p0") 243 and ("p1") 244 to form a linear address space.

FIG. 4 illustrates a specific configuration of range manager 321, according to at least one embodiment of the present invention. Further, FIG. 4 shows exemplary memory configuration evaluator 312 being configured to modify memory information in range manager 421a to form each adjusted range (i.e., from adjusted range AR0 to AR4) as characterized by the range parameters in range manager 421b. Continuing with the example of FIG. 3B, range manager 321 initially maintains memory information shown in range manager 421a. Range manager 421a identifies each range 211 by a range number ("range no.") 410, such as range zero, or R0. Corresponding to each range number 410 is a range base 412, a range size 414, a memory device number in partition zero ("MemDev No. in P0") 416, a memory device number in partition one ("MemDev No. in P1") 418, a memory device base in partition zero ("MemDev Base in P0") 420, and a memory device base in partition one ("MemDev Base in P1") 422. As an example, consider that range one, or R1, of FIG. 3B is associated with range base 412 of 2.0 GB (i.e., range base of range 211c at line 228) and MemDev Base in P1 of 1.0 GB (i.e., 1.0 GB physical memory locations of Mem Dev 0 238).

To reclaim memory holes in this example, memory configuration evaluator 312 modifies range manager 421a to yield the contents of range manager 421b, according to inputs 428, which includes THS 315 and other like information. In particular, memory configuration evaluator 312 modifies the range parameters of range one, R1, to form an adjusted range, AR1, which is between the base of translated memory hole 390g and the initial range base at line 228 for range 211c. As shown in range manager 421b, range size 414 is adjusted to adjusted range size 472, which is shown as 0.25. GB. This means that adjusted range AR1 includes an amount of memory set by regions "(B)" and "(H)," each of which include 128 MB of addresses. Collectively, regions "(B)" and "(H)" include 256 MB (i.e., $2^{28}$) number of addresses. Also, memory configuration evaluator 312 determines values 474 of "0" for both "MemDev No. in P0" 416 and "MemDev No. in P1" 418. Memory configuration evaluator 312 further modifies range manager 421a to include an additional range as adjusted range AR2, which has a value 474 of 0.75 GB to represent the size of AR2. Memory configuration evaluator 312 adjusts values 470 representing range bases 412 for AR2 to AR4 and also adjusts values 478 of "MemDev Base in P0" 420 and "MemDev Base in P1" 422 to 0.125 GB and 1.125 GB, respectively. With the modified values 470 to 478, address translator 309 can translate linear addresses into physical addresses in a manner that translates linear addresses into a physical address space that otherwise is precluded from use as system memory.

Figure 5A:
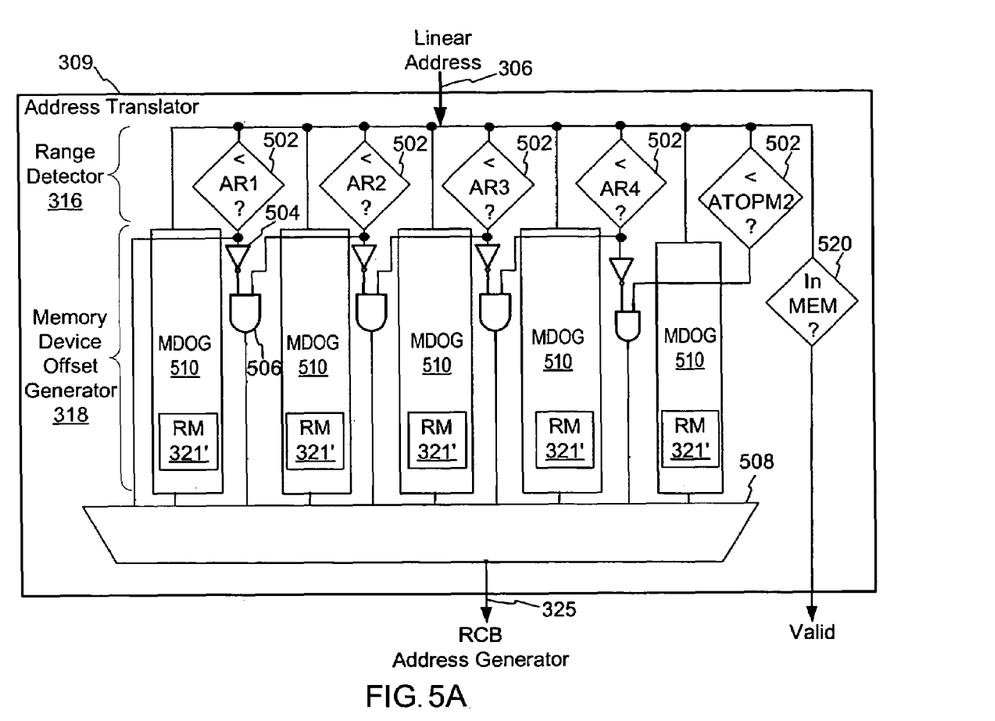
FIG. 5A shows an exemplary address translator, according to a specific embodiment of the present invention.

FIG. 5A shows an exemplary address translator 309, according to a specific embodiment of the present invention. In this example, address translator 309 includes range detector 316 and memory device offset generator 318. Range detector 316 includes a number of comparators 502 that compares linear address 306 to at least the bases of adjusted ranges as well as to the adjusted second top of physical memory ("ATOPM2"). MDOG 318 includes MDOGs 510, which are individual memory device offset generators ("MDOGs") configured to generate memory device offsets only for a particular range that a specific MDOG 510 belongs. In a specific embodiment, each of MDOGs 510 include a slice of range manager 321 as range manager ("RM") 321' so that range manager 321 need not be accessed external from address translator 309. A slice can include some or all of range parameters 410-422 for one adjusted range, AR(N). Comparators 502 each can control a multiplexer 508 for outputting a particular memory device offset. To illustrate the operation of address translator of FIG. 5, consider that a linear address falls within adjusted range one, or AR1. A second comparator 502 labeled "<AR2?" determines that linear address 306 falls within adjusted range AR2 and generates a "true" signal, which is input into one terminal of gate 506. As linear address 306 is not less than AR1, then the first comparator 502 labeled "<AR1?" generates a "false" signal, which is inverted by inverter 504. Inverter 504 then causes gate 506 to enable multiplexer 508 to output the results of MDOG 510 of that adjusted range (i.e., AR1), the results of which include translated address 325 or a portion thereof.

Note that in a specific embodiment, range detector 318 includes a comparator 520 to determine whether linear address 306 ("LA") is within the ranges of useable or translatable linear addresses (i.e., not within memory hole 213b) from linear address 0 to a linear address associated with address TOUM and from a linear address associated with address TOPM1 to a linear address associated with address ATOPM2. An exemplary Equation 1 suitable for performing such a determination is as follows.

In Range=$LA<TOUM$ OR[($LA>=TOPM1$)AND ($LA<ATOPM2$)]   Equation 1

A true result for "In Range" indicates that LA 306 does fall within the range, then range detector 318 generates a "valid" signal that indicates that translated address 325 is valid to use. Otherwise, if LA 306 is either within a memory hole (e.g., in memory hole 213b) or beyond address ATOPM2, range detector 318 generates a "not valid" signal (not shown) that indicates that the associated translated address 325 should be disregarded.

Figure 5B:
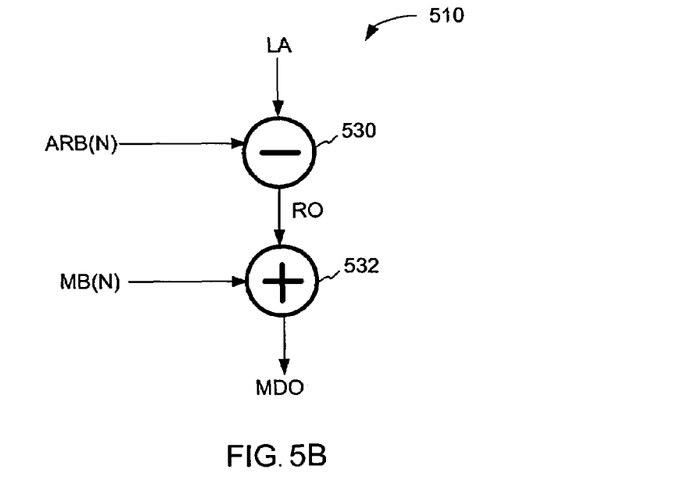
FIG. 5B depicts conceptual functionality of a memory device offset generator of FIG. 5A, according to an embodiment of the present invention.

FIG. 5B depicts conceptual functionality of a memory device offset generator 510 of FIG. 5A, according to an embodiment of the present invention. All or some of the bits of linear address ("LA") 306 are reduced by a number corresponding to an adjusted range base ("ARB(N)") for a specific adjusted range. The result of subtraction operation 530 forms a range offset, or "RO." Next, RO is increased by a number representing a memory device base ("MB(N)"). The result of addition operation 532 forms a memory device offset, "MDO," which is used as at least a portion of translated address 325.

Figure 6:
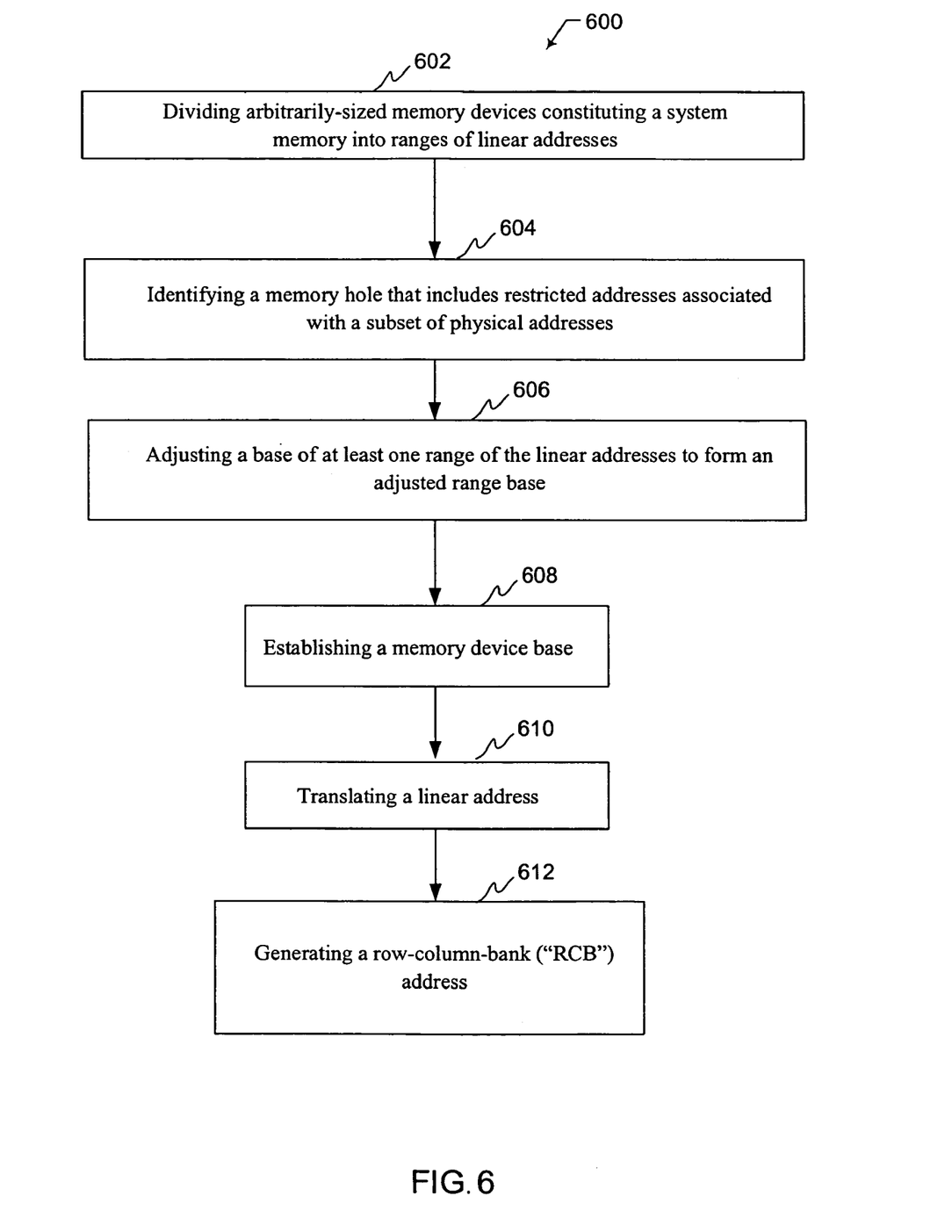
FIG. 6 depicts an exemplary flow diagram for a specific embodiment of the present invention.

FIG. 6 depicts an exemplary flow diagram for a specific embodiment of the present invention. Exemplary flow 600 is configured to reclaim a memory hole to increase memory available to a processor. At 602, a physical address space is divided into ranges of linear addresses that are associated with ranges of physical addresses. At 604, a memory hole including restricted addresses (i.e., restricted from use as system memory) is identified, the memory hole being associated with a subset of physical addresses. At 606, a base of at least one of the ranges of linear addresses is adjusted to form an adjusted range base, which corresponds to a base linear address defining the memory hole. The adjusted range base can be used to translate linear addresses into the subset of physical addresses. Further, a memory device base is established at 608, whereby the memory device base corresponds to the base linear address for specifying a physical address of the subset of physical addresses. The physical address is translated from a linear address of the linear address space and can be specified by identifying the specific memory device to which the linear address will translate. Or, the physical address can be specified by determining a number (i.e., identifier) of a partition to which the memory device belongs. At 610, the linear address is translated into a translated address, in whole or in part, by forming a memory device offset. Next at 612, a row-column-bank ("RCB") address is generated based on, at least in part, the memory device offset and specifying a device hit by this specific access.

FIG. 7 illustrates one technique of dividing physical address space in a manner suitable for reclaiming a memory hole, according to one embodiment of the present invention. Physical address space 700 is similarly arranged as physical address space 242 of FIG. 2, which can be thought of as being divided into ranges of "interleaved" linear addresses. As such, those linear addresses associated with partition zero (i.e., denoted as "(P0)") are interleaved in linear address space with those associated with partition one (i.e., denoted as "(P1)"). For example, addresses from DIMM A (P0) are interleaved with addresses from DIMM A (P1), at least for the first range. In some configurations, addresses from DIMM A (P0) can be designated as even cache lines and addresses from DIMM A (P1) can be designated as odd cache lines. Note that memory hole 213b can be disposed anywhere in linear address space, with adjustments to the ranges following evaluation of memory hole. Also note that addresses coming from only one partition (i.e., top portion of DIMM A ("P1") and DIMM B ("P1")) are non-interleaved.

FIG. 8 illustrates another technique of dividing physical address space in a manner suitable for reclaiming a memory hole, according to another embodiment of the present invention. Physical address space 800 is arranged such that memory devices in partition one ("P1") are associated with higher numbered linear addresses and that memory devices in partition zero ("P0") are associated with lower numbered linear addresses. This arrangement can be thought of dividing physical address space into ranges of "non-interleaved" linear addresses. Memory hole 213b is shown to split a range 802 of linear address, R1, into two adjusted ranges 804, AR1 and AR2.

FIG. 9 illustrates yet another technique of dividing physical address space in a manner suitable for reclaiming a memory hole, according to yet another embodiment of the present invention. Physical address space 900 is arranged such that memory devices in partition zero ("P0") and memory devices in partition one ("P1") are alternately associated with 8 byte interleaved portions 906 and 908, respectively. In this "ganged mode" technique, two or more partitions are of equal sizes. As an example, consider that bits b0 to b7 of each cache line come from DIMM A "(P0)" and bits b8 to b15 of each cache line come from DIMM A "(P1)." Other 8 byte portions are likewise interleaved. Note that interleaved portions 906 and 908 can be of any width (i.e., "N" bytes wide) and are not limited to 8 bytes. In this example, ranges R1 and R2 are adjusted to form adjusted ranges AR0 to AR2 to translate linear addresses into physical addresses of a reclaimed memory hole.

In a specific embodiment of the present invention, system memory generally is accessible within a 32-bit physical address space, which is maximized by reclaiming physical addresses that are otherwise lost to their associations with memory holes. Given that a 32-bit device (e.g., memory mapped device) can only access 32-bit address space, a processor's direct memory access ("DMA") to such 32-bit devices is therefore generally limited to the 32-bit address space. However, an operating system ("OS") might allocate a buffer to an application requesting the DMA that is not within the 32-bit address space. Thusly, when communicating with the 32-bit device, it is possible that the either the processor or the OS, or both, copies data from the 32-bit region addressable via the device before copying that data to a 36-bit region allocated to the application.

An embodiment of the present invention relates to a computer-readable medium having computer code thereon for performing various computer-implemented operations. In particular, control strategies of the invention may be implemented in software associated with a processor. The media and computer code may be those specially designed and constructed for the purposes of the present invention, or they may be of the kind well known and available to those having skill in the computer software arts. Examples of computer-readable media include hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. In fact, this description should not be read to limit any feature or aspect of the present invention to any embodiment; rather features and aspects of one embodiment may readily be interchanged with other embodiments. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A method of reclaiming a memory hole to increase memory available to a processor, the memory being divided into ranges of linear addresses associated with ranges of physical addresses and including a number of memory devices, the method comprising:
  identifying a memory hole that includes restricted addresses associated with a subset of physical addresses;
  adjusting a base of at least one of said ranges of linear addresses to form an adjusted range base corresponding to a base linear address defining said memory hole, wherein said adjusted range base is used to translate linear addresses into said subset of physical addresses;
  establishing a memory device base corresponding to said base linear address for specifying a physical address of said subset of physical addresses translated from a linear address of said linear addresses; wherein specifying said physical address comprises:
  identifying one of said number of memory devices to which said linear address translates; and
  determining which one of a number of partitions said memory device belongs;
  further comprising translating said linear address into said physical address, which otherwise is restricted from access by a processor as system memory; wherein translating said linear address comprises:
  decreasing a value representing a portion of said linear address by a value representing said adjusted range base to form a range offset; and
  increasing a value representing said range offset by a value representing said memory device base to form a memory device offset.

2. The method of claim 1 further comprising generating a row-column-bank ("RCB") address that includes said memory device offset.

3. A method of reclaiming a memory hole to increase memory available to a processor, the memory being divided into ranges of linear addresses associated with ranges of physical addresses and including a number of memory devices, the method comprising:
  identifying a memory hole that includes restricted addresses associated with a subset of physical addresses; and
adjusting a base of at least one of said ranges of linear addresses to form an adjusted range base corresponding to a base linear address defining said memory hole, said adjusted range base being used to translate linear addresses into said subset of physical addresses; wherein adjusting said base further comprises splitting one of ranges of linear addresses into at least two adjusted ranges, one of said two adjusted ranges including said adjusted range base and the other of said two adjusted ranges includes a number of linear addresses determined by forming a translated hole size for said memory hole.

4. The method of claim 3 wherein forming said translated hole size comprises:
  identifying said hole size for said memory hole; and
  determining a memory device size for a smallest memory device of said number of memory devices that has the smallest capacity of memory; and
  sizing said hole size to set said second linear address at a linear address that corresponds to a number that is a multiple of said memory device size.

5. A memory controller for reclaiming memory holes in a memory system divided into ranges of linear addresses associated with ranges of physical addresses and including a number of memory devices, the memory controller comprising:
  a memory configuration evaluator configured to identify a memory hole that includes restricted addresses associated with a subset of physical addresses and adjusting a base of at least one of said ranges of linear addresses to form an adjusted range base corresponding to a base linear address defining said memory hole, wherein said adjusted range base is used to translate linear addresses into said subset of physical addresses and wherein adjusting said base further comprises splitting one of said ranges of linear addresses into at least two adjusted ranges, one of said two adjusted ranges including said adjusted range base and the other of said two adjusted ranges includes a number of linear addresses determined by forming a translated hole size for said memory hole.

6. A memory controller for reclaiming memory holes in a memory system divided into ranges of linear addresses associated with ranges of physical addresses and including a number of memory devices, the memory controller comprising:
  a memory configuration evaluator configured to identify a memory hole that includes restricted addresses associated with a subset of physical addresses, adjust a base of at least one of said ranges of linear addresses to form an adjusted range base corresponding to a base linear address defining said memory hole, wherein said adjusted range base is used to translate linear addresses into said subset of physical addresses; establish a memory device base corresponding to said base linear address for specifying a physical address of said subset of physical addresses translated from a linear address of said linear addresses by identifying one of said number of memory devices to which said linear address translates and determining which one of a number of partitions said memory device belongs, translate said linear address into said physical address, which otherwise is restricted from access by a processor as system memory by decreasing a value representing a portion of said linear address by a value representing said adjusted range base to form a range offset and increasing a value representing said range offset by a value representing said memory device base to form a memory device offset.

* * * * *